(12) United States Patent
Karras (10) Patent No.: US 6,393,113 B1
(45) Date of Patent: May 21, 2002

(54) MEANS FOR AND METHODS OF DETECTING FRAUD, LACK OF CREDIT, AND THE LIKE FROM THE SS# 7 SYSTEM NETWORK

(75) Inventor: Ernest Karras, Oak Brook, IL (US)

(73) Assignee: Tekno Industries, Inc., Bensenville, IL (US)

( * ) Notice: Subject to any disclaimer, the term of this patent is extended or adjusted under 35 U.S.C. 154(b) by 0 days.

(21) Appl. No.: 09/098,045

(22) Filed: Jun. 16, 1998

Related U.S. Application Data
(60) Provisional application No. 60/050,369, filed on Jun. 20, 1997.

(51) Int. Cl.[7] .......................... H04M 1/24; H04M 15/00
(52) U.S. Cl. ................. 379/133; 379/32.01; 379/32.02; 379/32.05; 379/134
(58) Field of Search ................ 379/9, 10, 15, 379/1, 34, 230, 32.01, 32.02, 32.03, 133, 189, 32.05, 33, 134, 135, 229, 240; 370/252

(56) References Cited

U.S. PATENT DOCUMENTS

| | | | | |
|---|---|---|---|---|
| 5,438,570 A | * | 8/1995 | Karras et al. | 370/94.2 |
| 5,463,681 A | * | 10/1995 | Vaios et al. | 379/189 |
| 5,506,893 A | * | 4/1996 | Buscher et al. | 379/114 |
| 5,592,530 A | * | 1/1997 | Brockman et al. | 379/34 |
| 5,638,430 A | * | 6/1997 | Hogan et al. | 379/112 |
| 5,638,431 A | * | 6/1997 | Everett et al. | 379/115 |
| 5,706,338 A | * | 1/1998 | Relyea et al. | 379/189 |
| 5,712,908 A | * | 1/1998 | Brinkman et al. | 379/119 |
| 5,732,127 A | * | 3/1998 | Hayes | 379/115 |
| 5,757,895 A | * | 5/1998 | Aridas et al. | 379/136 |
| 5,802,145 A | * | 9/1998 | Farris et al. | 379/34 |
| 5,907,602 A | * | 5/1999 | Peel et al. | 379/114 |
| 5,946,379 A | * | 8/1999 | Bhusri | 379/115 |

\* cited by examiner

*Primary Examiner*—Curtis Kuntz
*Assistant Examiner*—Quoc Tran
(74) *Attorney, Agent, or Firm*—Michael Best & Friedrich LLC; J. Warren Whitesel (57) ABSTRACT

Service observing equipment monitors, detects, decodes correlates and generates Call Records and Report Summaries from digital and audio information on an individual call basis on either ANSI or CCITT Signaling System #7 systems controlled by data packets transmitted along high speed data links separated from the telecommunication audio channels. The equipment simultaneously responds to in-band signals such as Automatic Number Identification (ANI) digits and/or Customer Entered digits transmitted over the audio channels. A Call's decoded content is stored as correlated data until the end of a monitored call. Then the stored data is custom formatted into a Call Record and transmitted or printed out to enable study of how trouble free the telecommunication network is performing, detect fraud or credit violations and/or validate billing situations. An integral ZIP System simultaneously monitors the stored call data and is ready at all times during the call to generate interim ZIP Records to let the telephone system or recipient take corrective action while a call is in progress. Examples of such corrective actions are to trace the switching route and troubleshoot defective call setups before termination, to trap on Hot number, long-duration and/or duplicate credit card calls to prematurely terminate service and prevent fraud, to trace annoyance or malicious call and tape conversations, to eliminate abuse of pre-paid billing credit and the like.

19 Claims, 6 Drawing Sheets

MEANS FOR AND METHODS OF DETECTING FRAUD, LACK OF CREDIT, AND THE LIKE FROM THE SS# 7 SYSTEM NETWORK

This is a formal application replacing provision application Ser. No. 60/050,369, filed Jun. 20, 1997.

This invention relates to means for and methods of detecting fraud, lack of credit, maintenance problems and the like during the making of a telephone call and more particularly to detecting failures, the act of fraud, exhaustion of credit, or the like, in the SS#7 system network, especially while a call is in progress and while corrective action may still be taken.

BACKGROUND

U.S. Pat. No. 5,438,570 is for Service Observing Equipment for use with the Signaling System Seven ("SS#7") Telephone Networks. Service observing equipment provide means for monitoring a telephone network in order to determine the quality of service that is being given to the subscribers served by that network. The end product of the service observation equipment is Call Records and Report Summaries telling the management and maintenance personnel such things about the network as: how many calls went through which equipment, called, calling and charge numbers, the length of time required to perform the various call functions, the number and type of call failures, the location of congestion, flagrant dispositions, missing messages, calls of an excessive duration, premature cut offs, peak and overall link loading, and the like. From this information, the telephone company may acquire many advantages ranging from reports on routine maintenance, instant maintenance, planning future expansion, justifying billings and rate hikes, selling additional services, detection and prevention of fraud and the like.

In general the Network being monitored consists of a number of high speed, synchronous data links extending between switching transfer points ("STP") which enable switching points or end offices ("SP") to communicate directly with each other, via special protocols, independently of the voice or other communication paths used by the subscriber.

More particularly, the calling office assembles certain required control, monitoring, and supervision information into data packets, each of which is identified by its own address assigned on a per call basis. The data packet also contains identifications of calling and called subscribers, types of calls, equipment, and other pertinent information relating to the call identified by the packet address or "routing label". A description of a data packet and the manner in which it is transmitted over data links has sometimes been likened to a letter and its journey through the mail. The data packet itself is similar to a letter in an envelope which is identified by a sender's address and a recipient's address. The envelope or packet may travel over any of many alternate paths guided by these addresses.

The observation equipment has a plurality of memory locations each being capable of storing data relative to a given data packet. For the duration of a call, these locations are assigned individual addresses corresponding to the pertinent data packet address. As the data packets are transmitted along the high speed data links, the service observation equipment decodes those packets having an address of interest and stores the decoded information in the pertinent memory location having each call's address assigned to it. The progress of tones over the assigned audio communication channel are also monitored and corresponding data are also stored in the pertinent memory location.

After the receipt of the data packet indicating that a call has terminated, the data stored in the pertinent memory location for correlated data packets and related progress tones are read out to make appropriate service observation Reports and/or "Call Records", for that call. The data may also be stored in a secondary memory for further report processing. Then, the emptied memory location is reassigned to accumulate data relative to a new packet address.

The Call Records and Summary Reports after the call is terminated are invaluable tools for giving a better grade of telephone service. However, they are after-the-fact tools and do little or nothing to correct problems while they are occurring. For example, if a person has a poor credit rating, the only options are either to suspend his telephone service or to allow his calls to go through. If the person with a poor credit rating makes an expensive call to a far-away country, he may run up an enormous bill, which prior "in progress" technology could only be detected after the call terminated. To illustrate correcting a problem while it is "in progress", one option would be to allow such a person to talk for a few minutes and then either to cutoff the call or to switch it to a supervisor who could investigate the calling party.

A moments thought will bring to mind many other situations where it would be desirable for the telephone company to take suitable action while the call is in progress. For example, calls from an area frequented by drug dealers, criminals, and the like, may require different forms of action depending upon a profile of calls which are made by such people, "in progress" credit determinations for limited prepaid services, etc. Other services which may be provided by the inventive system are:

Processes SS#7 data from links to capture subscriber entered digits and conduct real-time hot number or long duration call traps with or without audio recording for on-site or remote surveillance.

Monitors related audio trunks to create unified, comprehensive call detail records including Touch-Tone Customer Entered Digits for local or remote processing.

Classifies calls into disposition categories such as busy, don't answer, no answer message, computer answer, switch blockage, call abandon, call complete etc.

Assigns audio and Touch-Tone receivers to detect secondary dial tones and dialed digits after an answer condition for preventing International Bypass and PBX Hacking.

Records and correlates the date & time; circuit number, called, calling and charge number; duration; point code, disposition; etc. plus secondary dial tones and all Customer Enter Digits (CED) after the "answer" message into a single output format.

Permits user created custom record formats with any specifically selected data fields for more efficient processing and multiple SS#7 applications.

Traps, stores and/or transmits calls immediately based on dialed digits before or after the answer message; calling or charge number; duration length or disposition.

Refilters stored Call Records by any combination of predefined record fields to pinpoint specific call detail patterns.

Correlates the voice circuit with SS#7 data to perform live audio surveillance while monitoring the real-time collection of call detail data.

Displays or prints calls in real-time, which match a called, calling or charge number and simultaneously activates a voice tape recorder.

Pre-programs studies to print locally on automatic schedule or upon exceeding thresholds or stores data in memory for remote polling or transmitting to host.

User friendly software with English language commands and help menus eliminate the need for technical expertise in SS#7.

BRIEF DESCRIPTION OF THE INVENTION

Accordingly, an object of the invention is to provide new and novel means for and methods of monitoring a telephone systems for the flexibility of taking different types of action while a call is in progress depending upon an observation of conditions during the call.

In keeping with an aspect of the invention, this and other objects are accomplished by using the same SS#7 Network connections and hardware that are described in U.S. Pat. No. 5,438,570. An additional feature (called a "ZIP Record") is generated from the SS#7 information packets. The term "ZIP" is an acronym for "ZIP Information Packet". As shown in U.S. Pat. No. 5,438,570, FIGS. 9A and 9B, it is consistent with the SS#7 symbology for each type of disposition to be identified by three letters or a combination of letters and numbers.

The "Call Records" are made after the termination of calls. The ZIP Record is somewhat like a stop motion, snap shot of the "Call Record" which is made in real time before termination or a Release or Release Complete Message is detected. The taking of the "Snap Shot" or Zip Record may be triggered by any of the SS#7 message signal units ("MSU"), the most interesting being IAM, ACM, and ANM, or matching a called, calling or charge number or exceeding a time duration. Hence, the ZIP Record is available while the pertinent call is still in progress.

BRIEF DESCRIPTION OF THE DRAWING

A preferred embodiment of the invention is used in connection with the system shown in the attached drawings, in which.

These figures are taken from U.S. Pat. No. 5,438,570 which may be consulted for more information. To make such a consultation easier, the reference numberals of the patent are retained herein.

BRIEF DESCRIPTION OF TELEPHONE SYSTEM

Figure 1:
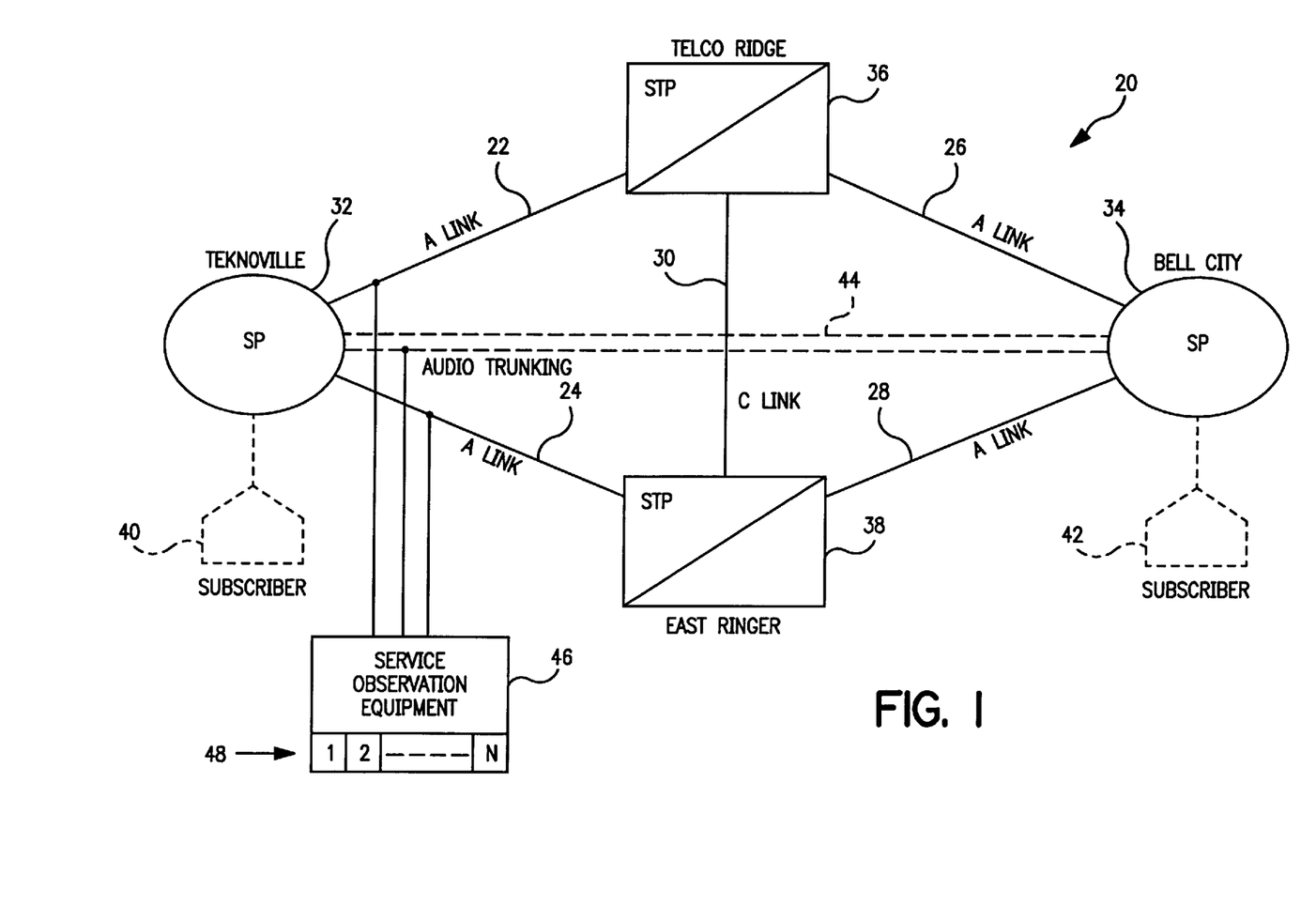
FIG. 1 is a simplified block diagram showing only the principles of a Signalling System Seven telephone trunking network.

FIG. 1 shows a network 20 having four high speed signalling links 22, 24, 26, 28, coupled in two mated pairs (i.e., 22/24 and 26/28). A C-Link 30 joins the center of the mated pairs. These five links are associated with two city telephone networks 32, 34, here called "Teknoville" and "Bell City", for convenience of description. The notation "SP" means end office switching points. These signaling offices are interconnected by high speed data links which extend between the two cities via two "STP's" (Signaling Transfer Points) 36,38.

Once the signalling offices 32, 34 have conveyed enough information back and forth, a calling subscriber 40 is connected to a called subscriber 42 via an audio or communication trunk 44. During the setup and entire duration of the call, telephone equipment in the two cities 32, 34 keep each other informed as to the status of the call by passing data packets back and forth over the signal links 22–28.

In all, the data packets may have many different kinds of Message Signal Units ("MSU") which may be exchanged over the signal links 22–30 during any call. Fortunately, only a few of these messages are used with great regularity, the most interesting being:

| COMMONLY USED MSU's | |
|---|---|
| Designator | Messages |
| IAM | Initial address message |
| ACM | Address complete message |
| ANM | Answer message |
| REL | Release message |
| RLC | Release complete message |
| COT | Continuity message |
| RSC | Reset circuit |
| SUS | Suspend |

If the foregoing analogy comparing a data packet on a signal link to a letter in the mail is not pushed to far, the content of these and other messages may be thought of as being similar to the content of messages which are contained in letters carried within the envelopes.

In operation, a conventional call begins in Teknoville 32 with a calling subscriber station 40 going off hook, receiving conventional local dial tone, and dialing the telephone number of a called subscriber 42 in distant Bell City 34. Responsive to the dialed telephone number, the local exchange equipment in Teknoville 32 formulates a data packet containing an initial address message ("IAM") including all information required to initiate a call, such as: calling number, called number, and any other pertinent information such as a collect call, a call back with time and charges, etc. Then, a "Routing Label" is added to the data packet, such as Point Codes and Circuit Identification Codes identifying the office "Teknoville" 36 as the originating office and "Bell City" 34 as the destination office and the "Audio Trunk" which is to be used 44.

The local call originating equipment SP 32 in Teknoville sends the data packet over an available link, such as link 22. A "Switching Transfer Point" STP 36 at an intermediate city "Telco Ridge", forwards the data packet over link 26 to call destination equipment SP 34 in the called end office in Bell City. If for any reason, link 26 cannot be used at this time, the data packet is send via C-Link 30 to STP 38 at yet another intermediate city, "East Ringer". The data packet is then sent via the mated A-link 28 to SP34.

Regardless of the path followed, the local end office at Bell City 34 takes the appropriate action required by the message which it receives in the data packet.

In this set up situation, the Bell City equipment prepares a data packet with the originating data packet addresses. The information in this data packet is an Address Complete Message, ACM. The Bell City Point Code is now the Originating Point Code, (OPC) and the (DPC) for this newly formulated data packet. The Initial Address Message from SP 32 also nominates an audio trunk 44 which Teknoville tested and found idle and now the Bell City equipment confirms its availability. Thus, the Address Complete Message ACM identifies and confirms the nomination of audio trunk 44.

Thereafter, the local equipment at the two cities 34, 32 generate ringing current and ring back tone respectively to alert the called and calling subscribers. The called subscriber answers and then an Answer Message ANM data packet on the link 28 and 24 is returned from Bell City 34 to Teknoville 32. The nominated audio trunk is cut through by both cities 32, 34 and conversation may now occur between Subscribers 40,42.

Upon termination of the call by a Subscriber 40 or 42, a data packet containing a Release message REL initiating termination and Release Complete RLC confirming the termination is sent between the cities to release all equipment and to disconnect the audio trunk 44.

BRIEF DESCRIPTION OF SERVICE OBSERVATION CONNECTIONS

Figure 2:
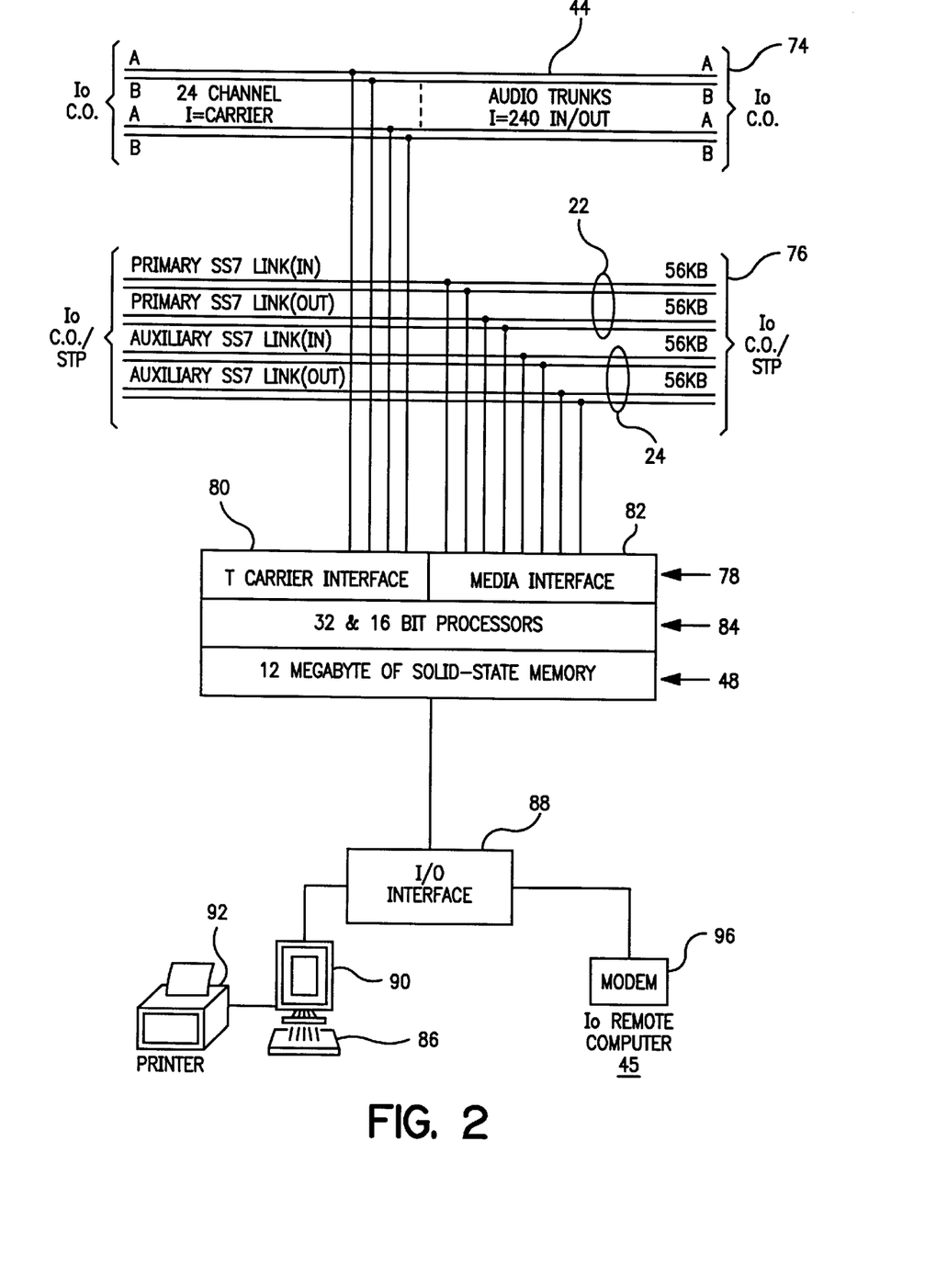
FIG. 2 is a block diagram showing of how the invention service observation system is interconnected into a Signalling System Seven network.

FIG. 2 is a block diagram of the inventive service observation equipment. The audio trunks (such as 44) are shown at 74. The high speed data links (such as 22 and 24) are shown at 76. The interface circuits 78 interconnect these trunks and links with the service observation equipment. As shown in FIG. 2 the interface 78 connects to two (or more) primary high speed data links 22 and two (or more) alternative high speed data links 24. At the interface level, these two types of interconnection (data links and audio trunks) remain segregated as shown at 80, 82, so that there can not be any feedback between them.

The data taken in at interface 80 and 82 are processed by suitable microprocessors 84 and then stored in suitable memory depositories at 48. All data is segregated on a per call basis as identified by the pertinent data packet addresses or as identified by the pertinent audio carrier channel or trunk for the older equipment with in-band signaling. Such means for storing call data is described in U.S. Pat. No. 5,438,570. For the newer equipment, the information carried by the data packets tells the microprocessor 84 which audio channel relates to the call being monitored. Among other things, the stored information which is processed at the microprocessor 84 may include the point codes, the number and identity of circuits, whether any satellites are used, the continuity and quality of the audio circuit, including calling and called identifications, and dispositions of the call.

In due course and at the end of a call (usually programmed into the equipment, but also manually accessed at 86), the Call Record information stored in the data depositories is processed into any suitable format and read out via interface 88, further analyzed by computer 90, and then printed out at 92, as a Call Record of the monitored call. In addition the microprocessor 84 filters the Call Records for output and/or processes them into user scheduled statistical Disposition, Message Type or Minutes of Use Reports.

In the alternative, the interface 88 may forward the Call Record information to a remote computer 45 via modem 96 or any suitable Local or Wide Area Ethernet Networks with transmission protocols such as TCP/IP etc.

Regardless of where or how the Call Record is produced and processed, it is then used by the operating telephone company as it sees fit, ranging from marketing, to engineering new equipment for providing a greater capacity, through maintenance, and to justification of billing and rate adjustments. Other uses include trapping annoyance calls, investigating local number portability plus, fraud and harassment detection, for example.

The information in the printed Call Record is decoded from the information carried by the data packets and the audio trunks. The Call Records are also segregated into twenty-one summary and fifty-nine detailed disposition categories. Among other things, the dispositions include: busy signals, call abandonments, no answers, circuit and switch blockage, no answer messages, no ringing, message failures, no service available. General disposition reports of call failures of many types, are reported by day and time, destination and origin point codes, circuit identifications etc. Call Records responsible for such failures are also trapped for tracing troubles, and the like. Many of these dispositions would be missed on an interworking network without monitoring the voice signals in conjunction with the data packets.

Block Diagram of Service Observation Equipment

Figure 3:
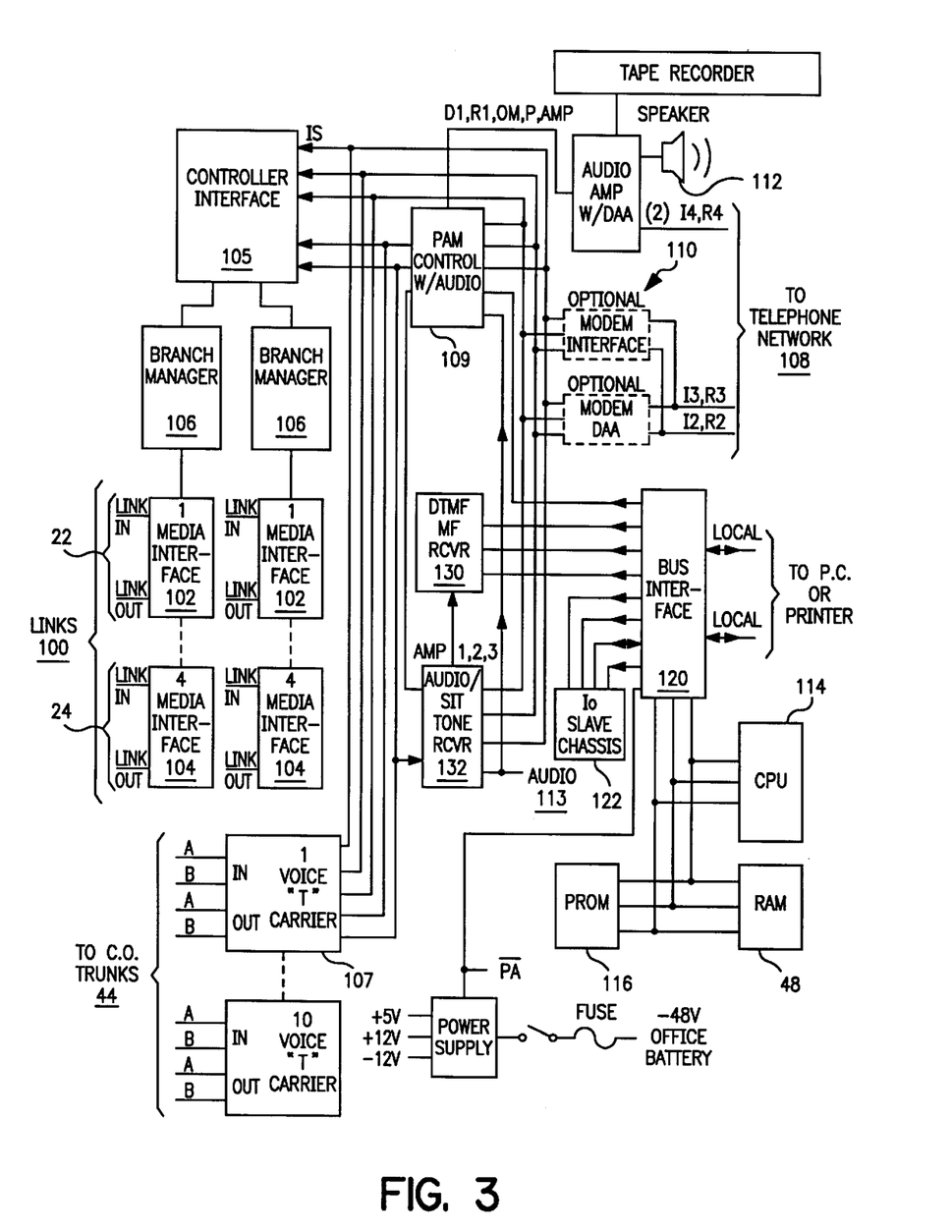
FIG. 3 is a block diagram showing the inventive service observation system.

FIG. 3 shows a block diagram of the service observation equipment. The high speed data links (such as 22, 24) are connected at 100 on the left side of FIG. 3. Each link connection is made via a printed circuit board (e.g., data link 22 is connected via 102). These interface printed circuit boards are controlled via a controller interface 105 and two "branch managers" (somewhat the same as a controller) 106 which coordinate signals.

The branch manager 106 is more or less identical to a controller 105, in design, but with less memory. It fits between the media interface 102 and the controller 105 to increase the capability of processing related messages from 2500 CIC's (Circuit Identification Codes) to 126,000 CIC's simultaneously into Call Records.

A "DTMF or MF receiver" 130 and "audio/sit" tone receiver 132 monitor the in-band audio signals in order to detect automatic number identification digits (ANI) and/or customer entered digits ("CED"), such as Multi-Frequency and/or Touch-Tone signals respectively. Other examples of in-band signals are dial tone re-order, busy, ringback and similar signals plus a SIT tone which generally precedes a recorded message, such as, "The number you called has been disconnected".

The tip (T) and ring (R) conductors of ordinary telephone lines 108 may also be connected to the service observation equipment at 108 in the upper right-hand corner of FIG. 3 and may terminate in a suitable modem or Local and Wide Area Network equipment 110 to access the equipment from a remote location.

A loud speaker or other audio reproducer 112 (such as a tape recorder) is also provided for manually monitoring the existence and the quality of any of the voice channels. When authorized by law, the tape recorder can also tap the line, recording conversations. An example of such a use is to collect evidence on a drug dealer, for example. An audio input is provided at 113.

The operation of the system is carried out under the control of a central processing unit ("CPU") 114 which, in turn, is controlled from an $E^2$PROM memory circuit 116. Data which is obtained by the service observation is stored in a random access memory ("RAM") 48 under the control of the CPU 114 and in accordance with the means described in U.S. Pat. No. 5,438,570.

In operation, a call appears on a monitored link and trunk. The CPU 114 assigns a receiver to serve the service observing needs and sends a time slot signal to the receiver. Thereafter, the CPU sends event signals every time that a related monitored event occurs on an observed link or trunk. As specific events (Message or tone) occur during the set up leading to a completion of call, the various parts of the system may activate various timers.

The pulse amplitude ("PAM") control circuit 109 is described in U.S. Pat. No. 4,849,971. It receives input signals, assigns input circuits to receive the signals, and sends out digitally modulated signals which may be stored at a depository memory location 48 (FIG. 3) or decoded for recording on a printer or magnetic tape, for example, to make a record of the events as they are being recorded. The PAM control circuit also feeds audio signals to an audio amplifier 110 and a loudspeaker 112 or tape recorder so that the quality or nature of the sound may be monitored.

Figure 4A:
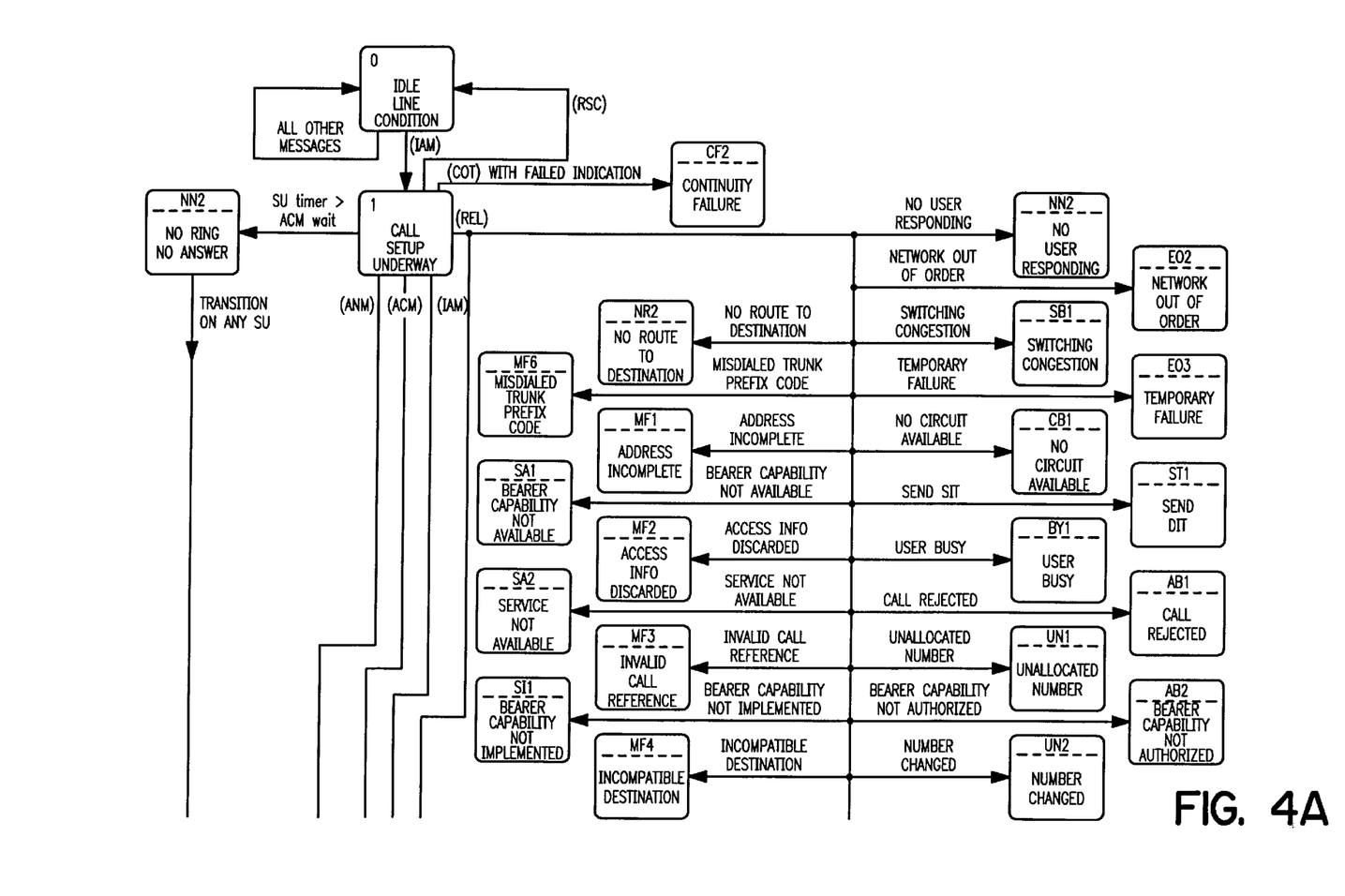
FIGS. 4A, 4B, when joined as showing in FIG. 4C, show a chart or tree of dispositions of the call data which is assembled in Call Records.
Figure 4B:
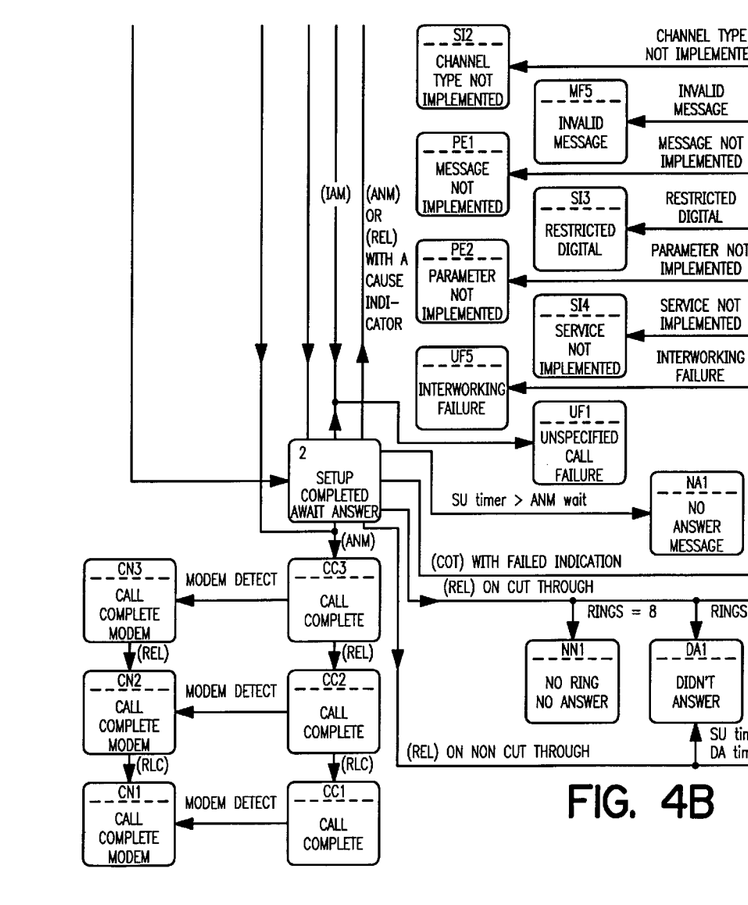
Figure 4C:
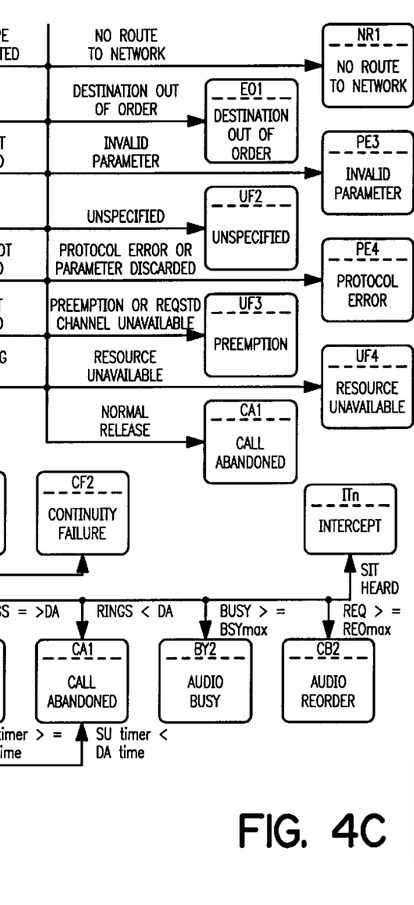

FIGS. 4A and 4B show a tree of message units or dispositions which are derived from the data packets and are collected, stored, and analyzed in order to provide service observations. Both of these message units and dispositions of FIGS. 4A and 4B are available and can be accessed. However, until the telephone call is terminated the stored information represented by FIGS. 4A and 4B is changing. Hence, the Call Record with the "final" Disposition is not made until the call is complete and the opportunity for the telephone system to take action has terminated.

Make the Zip Record

The invention normally decodes and stores the data content of the commonly used MSU's including Initial Address Message (IAM), Acknowledgement Message (ACM), and Answer Message (ANM) and the like. The stored data is used to generate a Call Record immediately upon receiving and decoding the Answer Message (ANM) (i.e. after the call is answered), matching predefined calling, called, charge number, Automatic Number Identification (MF) digits or Customer Entered (DTMF) digits and/or exceeding a duration threshold.

The resulting information includes such things as the date and time when a call is initiated; the called, calling and charge numbers; and the like. The generated Call Record also contains a ZIP Disposition categorization and a ZIP counter. In this manner, one can distinguish and analyze the setup of a call while it is "in progress" instead of waiting until the call is complete (i.e. a call is complete when a Release or a Release Complete (MSU) information is received). The importance of such an "in progress" detection is that an immediate action may be taken: such as releasing a call for fraud or credit purposes, perhaps locking a call so that it cannot release in order to trap an obscene or annoyance caller, or to investigate or give the calling party a warning, or the like. When properly authorized to do so, the ZIP Record can also trigger the recording of a conversation during an observed call.

Data packets, related to the ZIP information packets, are received over links 100 (FIG. 3) and are decoded at a media interface circuit 102 or 104. The same data information packets are stored in memory space in the controller interface 105 for both a Call Record and a ZIP Record. Depending upon the programmed instructions, any of the SS#7 message signaling units ("MSU") may trigger a read out of a ZIP Record from the data stored in the memory space.

The ZIP Record is sent from controller interface 105 to the CPU 114 which stores it in RAM 48 and also outputs it through modem 110 or through the bus interface 120 to a personal computer PC or printer, etc., all in the manner disclosed in U.S. Pat. No. 5,438,570.

Hence, the Zip Record is available almost as soon as the triggering SS#7 message signal unit (MSU) appears.

This technique also permits a flagging of calls with "Hot" called, calling or charge numbers for investigation of further processing. For instance, a call made to a foreign country could have a pre-assigned 15-minute threshold. When any call's duration to that foreign country exceeds that threshold, a ZIP Record would be generated (displayed) in order to investigate the charge (calling) number's normal calling patterns; calling party's present credit level; or whether the call originated from a pay station, prison, subscriber line, business line, etc. Based on the results of this investigation and while the call is still "in progress", it may be either permitted to proceed or to be "intentionally disconnected". Of course, other appropriate functions may be programmed into the system.

In this manner, the service provider can prevent large losses from fraud rather than having to pursue the collection of lost revenue responsive to normally terminated calls of long-duration. This same concept can be used for pre-paid billing and real-time maintenance applications as well.

Upon generating the ZIP Record, the invention does not discard the information in "memory". Instead, the system continues to collect information regarding the call until the call is terminated normally, at which time a conventional Call Record is generated with an indication of a valid disposition such as Call Complete, Call Abandon, Busy, etc. and the actual duration or billing time. Thus, the ZIP Record is a prelude to the normal Call Record.

In this manner, the ZIP Record can also be used for real-time, Hot number, long duration, duplicate credit card use, credit violation analysis and the like and subsequently the two records (Call Record and ZIP Record) may be combined for insertion into a database in order to perform conventionally longer term fraud detection applications such as velocity checks; billing validation and verification, trunk engineering and access charge measurements etc.

The ZIP Record may also be expanded by an addition of Automatic Number Identification (ANI) digits MF (Multi Frequency Signaling System) or customer entered digits ("CED") derived from decoding DTMF tones ("Touch-Tone" dialing) received over the analog trunks (voice path). For instance, the Service Observing System may be monitoring the SS#7 links for the called and calling number and monitoring the analog voice circuits for secondary called numbers during hacking or International Bypass or for credit validation information because the subscriber must manually enter his credit or debit card, or his charge number once the call is successfully connected to the validating switch. In this instance, the ZIP Record would also carry the credit information and any other data that may be found responsive to customer entered digits.

In some instances, a ZIP Record may be generated immediately upon receiving an Initial Address Message (IAM) or with receipt of an Acknowledgement (ACM) or Answer (ANS) message or after receipt of each series of customer entered digits for the same call. The ZIP Counter is advanced each time that a ZIP Record is generated in order to distinguish one ZIP Record from the other because other than time stamps the data content could be the same for different records.

Figure 5:
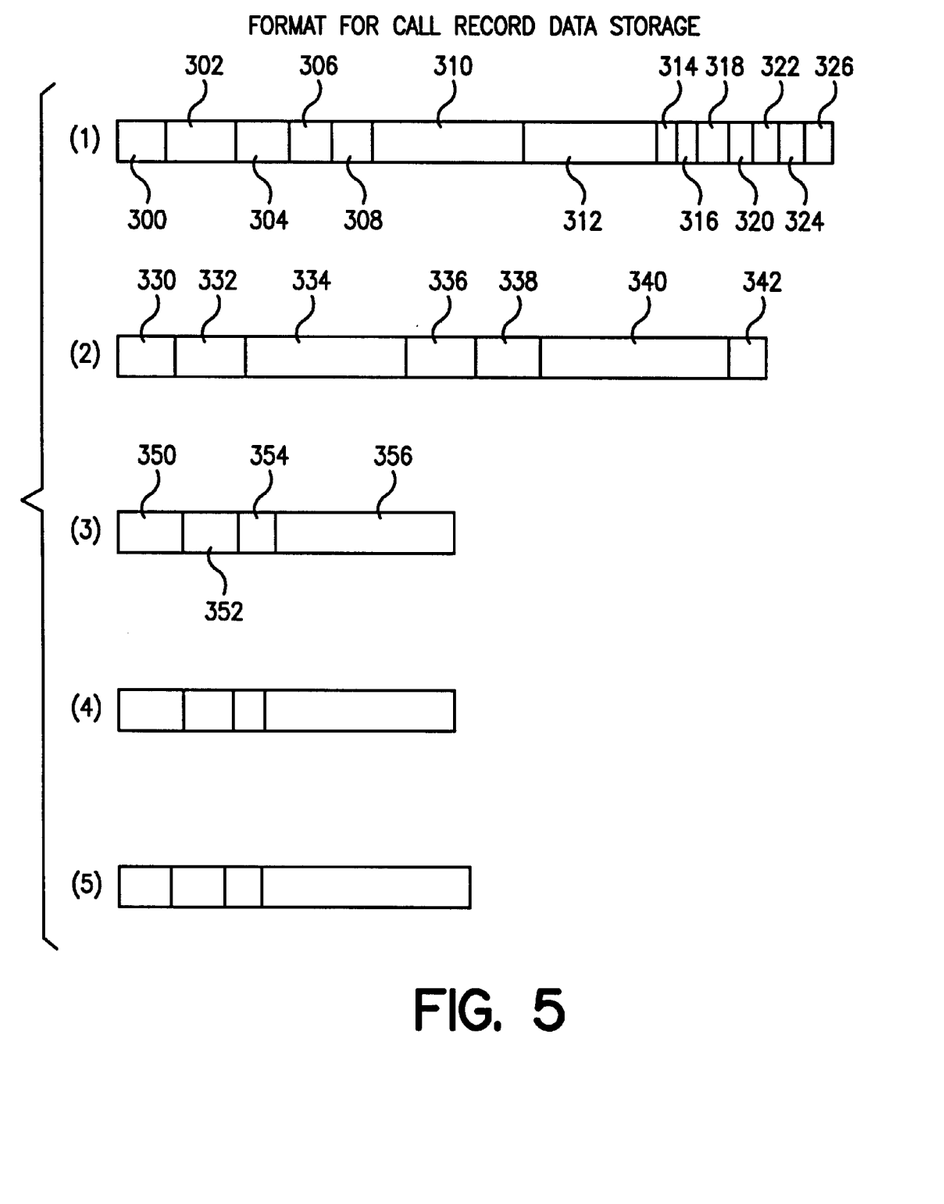
FIG. 5 is a block diagram showing the manner in which the inventive Service Observation System stores data packets and audio information in a correlated fashion to generate Call Records.

FIG. 5 shows the five line format of binary words which is used to store information in RAM 48 (FIG. 3) of the inventive system after that information is either received over a data link or audio channels or generated internally (such as the time of day). The binary signals may be either taken directly from or translation responsive to information signals in the data packet or audio tones; or, they may be generated within the service observation equipment 46 (FIG. 1). For more information please see U.S. Pat. No. 5,438,570.

Those who are skilled in the art will readily perceive how to modify the invention. Therefore, the appended claims are to be construed to cover all equivalent structures which fall within the true scope and spirit of the invention.

What is claimed is:

1. A telephone service observation system for a telephone network controlled by digital data packets sent over high speed data links, each of said data packets carrying routing information relating to individually associated calls which are identified in said packets by addresses assigned to said individually associated calls, said service observation system comprising:

means for non-intrusively connecting said service observation system to at least a selected one of said data links;

means in said service observation system for monitoring and storing said data packets as they are being transmitted over said selected links during an observed call;

means responsive to said stored data packets for accumulating and correlating call record information derived from said data packets having the packet address corresponding to the address assigned to the observed call, said accumulated data being stored in memory means dedicated to said observed call for the duration thereof;

means responsive to an event selected from a group consisting of an elapsed time period, dialed digits, calling number, called number, charge number, or a selected data packet for immediately reading out a ZIP Record comprising a snap shot of a call record at the time of the selected event in order to give information then available to initiate a pre-programmed action relative to the observed call while said call is still in progress, and means responsive to termination of said call for reading out complete information for said call and then preparing a complete call record.

2. The system of claim 1 further including means for decoding and correlating the stored monitored data into a ZIP Record for making a call in progress analysis.

3. The system of claim 2 and means responsive to said ZIP Record for differentiating between an incompleted call and a normal call with a normal termination responsive to a data packet that triggers a release of the observed call.

4. The system of claim 2 and means wherein said ZIP Record excludes a final call duration signal and includes normal real-time data incorporating called and calling party identification, charge number, point code, a ZIP disposition, and ZIP counter means for indicating the number of ZIP Records generated for the same call and holding time indicating an elapse of time that occurs during a period beginning with an initiation or answer of a call and continuing up to the time of said ZIP Record.

5. The system of claim 4 and means for expanding the ZIP Record to including information derived from one of automatic number identification digits and customer entered digits sent by a subscriber.

6. The system of claim 5 and means for forwarding said ZIP Record to a validating processor for performing a real-time function selected from a group consisting of maintenance, credit card and fraud analysis during said observed call.

7. The system of claim 2 and service observing system means for filtering the ZIP Records via any SS#7 data field in order to limit the data output for downstream processing.

8. The system of claim 2 and means for trapping calls responsive to elements of the ZIP Record indicating at least some information relating to calling, called, and charge numbers, and means for automatically connecting a tape recorder to an analog circuit involved in said observed call for recording a conversation while the call is in-progress.

9. The system of claim 2 and user controlled means for selecting any data fields stored from decoded SS#7 messages for causing such stored data to appear in the ZIP Record output format.

10. A process for observing service given by a telephone system controlled by digital data packets, each of said packets containing routing information, said data packets being sent over high speed data links, said process comprising the steps of:

a. non-intrusively coupling auxiliary service observing equipment to said data links;

b. observing and storing said data packets in said service observing equipment responsive to said routing information as said packets appear on said data links, said data packets being stored in memory fields assigned to individual calls for the duration of such calls;

c. simultaneously observing and storing said data packets comprising a ZIP Record compiled as the data packets appear on said data link;

d. delivering a ZIP record containing said ZIP stored data immediately and during the call while in progress responsive to an event selected from a group consisting of an elapsed timed period, dialed digits, calling number, called number, charge number or at least a selected one of said data packets as it appears on said data links, said ZIP record being a snap shot of a call record as it exists at the time when said selected event occurs;

e. selectively causing said telephone system or recipient to take an immediate or preprogrammed action in response to the ZIP Record or stored data of step b; and f. preparing and delivering a complete call record for an observed call responsive to said data stored in step b. and responsive to a data packet terminating a call including final duration and disposition data fields.

11. The process of claim 10 wherein step d. includes the further step of measuring a period of time following an establishment or answer of a call and prematurely terminating that call.

12. The process of claim 10 wherein step d. includes the further steps of running a credit or fraud check on a telephone calling number, and either prematurely terminating a call or allowing the call to continue to reponse to said check.

13. The process of claim 10 wherein step d includes the further step of recognizing a Hot called number of an established or answered call and then prematurely terminating that call.

14. The process of claim 10 wherein step d includes any one of the claims 11, 12 and 13 and means to prematurely terminate a call.

15. The process of claim 10 wherein step d includes the further step of sending said ZIP Record to a device selected from a group consisting of a central processor unit (CPU), a random access memory, a personal computer, a printer, a telephone network, wide area network, a local loud speaker, and a tape recorder in response to data contained in said ZIP Record.

16. The process of claim 10 and the further step of storing data contained in automatic number identification (ANI) and customer entered digits appearing in-band and on audio channels carrying said observed call in said telephone system.

17. The process of claim 16 wherein said automatic number identification of customer entered digits include credit or debit card numbers.

18. The process of claim 16 wherein said customer entered digits are secondary signals for controlling older telephone systems which respond to in-band signals.

19. The process of claim 16 wherein said automatic number identification (ANI) and customer entered digits are included in said ZIP and final Call Record formats to perform maintenance, credit card and fraud analysis and the like.

* * * * *